US006248682B1

(12) United States Patent
Thompson et al.

(10) Patent No.: US 6,248,682 B1
(45) Date of Patent: Jun. 19, 2001

(54) INCORPORATION OF ZEOLITES INTO HYBRID POLYMER MATRICES

(75) Inventors: Robert W. Thompson, Holden, MA (US); Bradd E. Libby, Portland, ME (US); Mary B. Berry, Worcester, MA (US); Klaus Rose, Kitzingen; Karl-Heinz Haas, Veitshochheim, both of (DE)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 09/448,091

(22) Filed: Nov. 23, 1999

(30) Foreign Application Priority Data

Nov. 23, 1998 (DE) .............................................. 198 53 971

(51) Int. Cl.$^7$ ............................... B01J 20/28; B01J 35/00
(52) U.S. Cl. .................................. 502/4; 502/60; 502/62; 502/63; 502/64
(58) Field of Search .................................. 502/4, 60, 62, 502/63, 64

(56) References Cited

U.S. PATENT DOCUMENTS

| | | |
|---|---|---|
| 4,138,363 | 2/1979 | Hertzenberg et al. . |
| 4,250,081 | 2/1981 | Bode et al. . |
| 4,414,005 * | 11/1983 | De Bievre et al. ...................... 55/75 |
| 4,454,056 | 6/1984 | Kittelmann et al. . |
| 4,499,230 | 2/1985 | Lockhart . |
| 4,529,750 | 7/1985 | Gimpel . |
| 4,680,319 | 7/1987 | Gimpel et al. . |
| 4,699,892 | 10/1987 | Suzuki . |
| 4,735,193 | 4/1988 | Kulprathipanja et al. . |
| 4,740,219 | 4/1988 | Kulprathipanja et al. . |
| 4,925,562 | 5/1990 | te Hennepe et al. . |
| 4,973,606 | 11/1990 | Sterzel et al. . |
| 5,233,006 | 8/1993 | Wolter et al. . |
| 5,399,738 | 3/1995 | Wolter et al. . |
| 5,525,680 | 6/1996 | Bressan et al. . |
| 5,571,768 * | 11/1996 | Chang et al. ........................... 502/64 |
| 5,726,114 * | 3/1998 | Chang et al. ........................... 502/64 |
| 6,051,517 * | 4/2000 | Funke et al. ............................. 502/4 |

FOREIGN PATENT DOCUMENTS

| | | |
|---|---|---|
| 02060114 | 11/1991 | (JP) . |
| 02152315 | 2/1992 | (JP) . |
| WO 97/37752 | 10/1997 | (WO) . |

OTHER PUBLICATIONS

T. Bein, et al., "Formation and Characterization of Inorganic Membranes from Zeolite–Silica Microcomposites," Better Ceramics Through Chemistry III, C.J. Brinker,et al. (eds.), Mat. Res. Soc. Symp. Proc., vol. 121, pp 761–766 (1988).
J.M. Duval, et al., "Preparation of Zeolite Filled Glassy Polymer Membranes," Journal of Applied Polymer Science, vol. 54, pp 409–418 (1994).
Y. Hu, et al., "Rubber–like Elasticity of Organically Modified Silicates", J. Mater. Sci. 27: 4415–4420 (1992).
Y. Hu,et al., "Gelation Kinetics of an Organically Modified Silicate", J. Mater. Sci. 28: 6549–6554 (1993).
T. Iwamoto, et al., "Ormosil Coatings of High Hardness", J. Mater. Sci. 30: 2566–2570 (1995).
A. Nazeri, et al., "Ceramic Composites by the Sol–Gel Method: A Review", Ceram. Eng. Sci. Proc. 14: 1–19 (1993).
K. Rose, et al., "Multifunctional Acrylate Alkoxysilanes for Polymeric Materials", Better Ceramics Through Chemistry V, M.J. Hampden–Smith, et al. (eds.), Mat. Res. Soc. Symp. Proc., vol. 271, (1992) p 731–736.
K. Rose, "Photo–crosslinked Polysiloxanes—Properties and Applications," Organosilicon Chemistry II: From Molecules to Materials, N.Auner, et al. (eds.), VCH Publishing (New York 1995), pp 649–653.
G. Schottner, et al., "Concepts for the Design of Intelligent Organic–Inorganic Hybrid Polymers," Advances in Science and Technology 10: Intelligent Materials and Systems, P. Vincenzini (ed.), Techna (Faenza, Italy, 1995), pp251–262.

* cited by examiner

Primary Examiner—Tom Dunn
(74) Attorney, Agent, or Firm—R. Dennis Creehan

(57) ABSTRACT

A family of innovative composite zeolite materials and methods for making the same are disclosed. Zeolites 3A and 13X have been incorporated into hybrid polysiloxane polymers to form composite materials which are useful as membranes for separating a variety of gaseous and liquid materials. Thermal curing, thermal drying and UV curing were utilized to initiate polymer crosslinking reactions and bond the polymers to zeolite surfaces. Thin film samples exhibited nitrogen adsorption as high as 126 cc/g and specific surface area of up to 390 m$^2$/g. Infrared characterization spectra and TEM analysis indicated that polymeric matrices bonded to zeolite surfaces. Pore size of the composite membrane films may be tailored for specific separation applications through choice of zeolite and polymer compositions, curing method, and post-synthesis membrane treatments.

14 Claims, 1 Drawing Sheet

INCORPORATION OF ZEOLITES INTO HYBRID POLYMER MATRICES

FIELD OF THE INVENTION

The present invention is generally concerned with zeolite materials. More particularly, the invention is directed to zeolite-containing hybrid polymer membranes and methods for making the same.

BACKGROUND OF THE INVENTION

Over the past twenty years, there has been considerable interest in developing zeolite-based membranes for gas or liquid separations, reactor/separators, and sensor/detector applications. The potential cost savings in reduced energy consumption of low temperature gas separations by physical means rather than using cryogenic methods has motivated this research in developing microporous membranes. Polymer films, carbon molecular Sieves, ceramic membranes, and zeolite membranes have all attracted attention for various applications. Zeolites in particular, due to their inherently regular pore dimensions on the molecular scale and high thermal stability, have been the subject of numerous studies.

The most common method of synthesizing zeolite-based membranes has been to place a host substrate, for example a macroporous support surface, into a zeolite reagent solution, such as solutions conventionally used for hydrothermal zeolite synthesis, in some particular orientation, and simply allow the zeolite crystals to form and grow on the substrate surface. Variations of this method include applying seeded gel mixtures or gel solutions on amorphous substrates to form polycrystalline zeolite aggregates on the host surface. The primary requirement of the host surface in these methods is that the surface remain stable in a hydrothermal environment with pH of up to about 13.5 and temperatures up to about 180° C. Prolonged exposures under such conditions require that host substrates resist dissolution, except in the case of clay supports where the substrate provides some of the material for zeolite formation [see Engelen, C. W. R. and van Leeuwn, W. F., "Membrane for Separating Off Small Molecules and Method for the Production Thereof," International Patent (Mar. 27, 1992)].

Numerous studies have disclosed such hydrothermal synthesis methods [see Tsikoyiannis, J. G. and Haag, W. O., *ZEOLITES* 12 (1992) 126–130; Sano, T., Kiyozumi, Y., Mizukami, F., Takaya, H., Mouri, T., and Watanabe, M., *ZEOLITES* 12 (1992) 131–134; Jansen, J. C., Kashchiev, D., and Erdem-Senatalar, A., Stud. Surf. Sci & Catal., No. 85, Jansen, J. C., Stöcker, M., Karge, H. G., and Weitkamp, J., eds. (1994) 215–250; Van Bekkum, H., Geus, E. R., and Kouwenhoven, H. W., Stud. Surf. Sci. & Catal., No. 85, Jansen, J. C., Stöcker, M., Karge, H. G., and Weitkamp, J., eds. (1994) 509–542; Yan, Y., Davis, M. E., and Gavalas, G. R., *Ind. Eng. Chem. Res.* 34 (1995) 1652–1661; Lavallo, M. C., Gouzinis, A., and Tsapatsis, M., *AIChE J.* 44 (1998) 1903–1913; Xomeritakis, G., Gouzinia, A., Nair, S., Okubo, T., He, M., Overney, R. M., and Tsapatsis, M., *Chem. Eng. Sci.* 54 (1999) 3521–3531] In one variation of these synthesis methods, MFI seed solutions have been utilized to minimize the depth of layers of crystals [see Lavallo, M. C., Gouzinis, A., and Tsapatsis, M., *AIChE J.* 44 (1998) 1903–1913; Xomeritakis, G., Gouzinia, A., Nair, S., Okubo, T., He, M., Overney, R. M., and Tsapatsis, M., Chem. *Eng Sci.* 54 (1999) 3521–3531; Albers, E. W. and Grant, C. E., U.S. Pat. No. 3,730,910].

Typically, such approaches result in the formation of randomly oriented polycrystalline films on the host surfaces which have well defined grain boundaries between the individual crystals. Grain boundaries are "sealed" to some extent by allowing the polycrystalline mass to grow in the third dimension, that is to make the grain boundaries thick. More specifically, since randomly positioned crystals on a support surface have no crystallographic orientation, very weak bonds form between crystals, if at all, and the defects are "sealed" by allowing the depth of the grain boundaries to be sufficiently large.

Problems associated with these approaches to zeolite membrane synthesis have been documented in recent studies [see Saracco, G., Neomagus, H. W. J. P., Versteeg, G. F., and van Swaaij, W. P. M., *Chem. Eng. Sci.* 54 (1999) 1997–2017; Szostak, R., "*Molecular Sieves: Principles of Synthesis and Identification,*" $2^{nd}$ edition (1998) Blackie Acad. & Prof., London]. The deficiencies of these methods include formation of numerous defects (leaks) along grain boundaries, very weak mechanical strength along the grain boundaries, low fluxes of gases due to the excessive depth of the zeolite layer, poor selectivity due to the random orientation of pore structures normal to the flux, and poor adhesion between the substrate and zeolites. Attempts to overcome these limitations by reducing the depth of the zeolite layer to increase the flux through the "gate-keeper" layer results in decreased mechanical strength due to the lack of bonding between randomly oriented crystallites [see Gonthier, S. and Thompson, R. W., Stud. Surf. Sci. & Catal., No. 85, Jansen, J. C., Stöcker, M., Karge, H. G., and Weitkamp, J., eds. (1994) 43–73.]. The resultant materials that are typically produced by such methods are undesirable for commercial applications since vibrations resulting from pumps, compressors, and high fluid flow rates in actual industrial settings are likely to fracture the weak zeolite layers resulting in premature membrane failure or deterioration.

In a recent study, ZSM-5 crystals have apparently been incorporated into conventional polymer films and selective separations have been achieved [see Duval, J. -M., Kemperman, A. J. B., Folkers, B., Mulder, M. H. V., and Desgraddchamps, G., *J. Appl. Polym. Sci.* 54 (1994) 409–418]. U.S. Pat. No. 4, 973,606 teaches insertion of zeolites into polymers, such as thermoplastic elastomers or duromers, for producing membranes with controllable selectivity for material separation. U.S. Pat. No. 5,069,794 teaches application of zeolite coatings to different substrates to act as thin membranes. However, these approaches appear to be somewhat limited since they apparently do not enhance the separation capabilities of the polymer matrix component of the membrane film. Furthermore, films produced by this method are apparently fragile, and difficult to manipulate, suggesting that such films would be impractical for industrial applications. These polymer films have additional limitations due to their low thermal stability since they either decompose or melt at relatively moderate temperatures. Decomposition of such materials typically produces undesirable porosity and carbonaceous residues.

Incorporating molecular sieve zeolites into silica films has been previously reported by Bein, et al. [see Bein, T., Brown, K., Enzel, P., and Brinker, C. J., *Mat. Res. Soc. Symp. Proc.*, Vol 121 (1988) 761–766]. However, this approach utilizes tetraethylorthosilicate (TEOS) as the sole source of silica. Such films have exhibited impermeability to nitrogen as the use of pure TEOS apparently limits control of the membrane matrix porosity. The resultant film matrix has very low porosity and small pore dimensions and there appears to me little flexibility in tailoring porosity with such membrane matrix materials. This matrix limitation apparently requires that the maximum thickness of the membrane matrix matches the dimension of the zeolite crystals such that zeolite crystal faces protrude from both sides of the membrane matrix. Such a requirement poses a significant limitation where incorporating high surface area, submicron zeolite crystals is desirable.

One limitation of all of the above methods is that forming a zeolite film coating with such approaches typically requires high-temperature processing that degrades the organic component. In membrane applications, materials formed by high temperature methods are generally undesirable due to their impermeability to gas. In addition, with such methods it is difficult to control the porosity of the conventional organic polymer matrices in which the zeolites are layered. Another significant limitation is the poor adhesion of composite membrane layers on various surfaces and poor bonding between the matrix and the zeolite.

Thus, it is desirable to provide a polymer containing zeolites with optimal permanent bonding between zeolite and matrix that can be obtained at low temperatures and that simultaneously permit good adhesion to substrates and controlled membrane porosity. If a hybrid inorganic/organic polymer synthesis method can be successfully developed for applications in fabricating zeolite polymer membranes, it would be possible to overcome many of the limitations of these prior art membranes.

SUMMARY OF THE INVENTION

A relatively new approach to tailoring the properties of sol-gel derived materials has emerged which involves organic compound additions to gels for modifying the characteristics of inorganic sol-gel materials. In this approach, the inorganic part of the matrix-forming material provides rigidity and thermal stability, while the organic components in general contribute elasticity and flexibility, although at the expense of some thermal stability. Recent studies by Mackenzie, et al, and others have documented such approaches [see Hu, Y. and Mackenzie, J. D., *J. Mater. Sci.* 27 (1992) 4415–4420; Mackenzie, J. D., Chung, Y. J., and Hu, Y., *J. Non-Cryst. Sol.* 147&148 (1992) 271–279; Hu, Y., Chung, Y. J., and Mackenzie, J. D., *J. Mater. Sci.* 28 (1993) 6549–6554; Iwamoto, T. and Mackenzie, J. D., *J. Mater. Sci.* 30 (1995) 2566–2570; Nazeri, A., Bescher, E., and Mackenzie, J. D., *Ceram. Eng. Sci. Proc.* 14 (1993) 1–19; Rose, K., Wolter, H., and Glaubitt, W., *Mat. Res. Soc. Symp. Proc.* 271 (1992) 731–736; Schottner, G., Rose, K., and Schubert, U., *Intell. Mater. & Sys.* (1995) 251–262; Rose, K., Organosilicon Chem. II, Auner, N. and Weis, J., eds. (1996) 649–653]. With these methods, co-polymers are typically formed from alkoxysilanes, usually with TEOS or tetramethylorthosilane (TMOS) as the primary silica source. In these methods, hydrolysis reactions, usually in acid media, precipitate silica moieties, which are then crosslinked by condensation reactions between other silane molecules or silica moieties which have external —OH groups at their surfaces.

Inorganic/organic polysiloxane hybrid polymers are known in the art and described in *High Performance Ceramic Films and Coatings* (Elsevier Science Publishers B. V., 1991), which is herein incorporated by reference. One family of these hybrid polymers which has particular utility is commercially available from Fraunhofer-Gesellschaft (Munich, Germany) and designated by German trademark ORMOCERS®. Inorganic-organic polysiloxane hybrid polymers are also disclosed in German patent DE 43 03 570, which is herein incorporated by reference.

The innovative methods and materials of the present invention employ an innovative hybrid polysiloxane polymer which acts as a matrix or binder for zeolite additives to form a zeolite-polymer composite. Virtually any zeolite material or mixtures of zeolites may be utilized for the composite materials of the present invention. In preferred embodiments, MFI zeolites, such as alumino-silicate ZSM-5 zeolites or high silica Silicatites may be employed. However, other zeolites having desirable sorptive or catalytic properties may be utilized for specific applications.

The zeolite-polymer composite materials of the present invention further provide for low curing temperatures which enable much greater retention of their polymer component than materials made from conventional polymer precursor materials. As a direct result, the membranes of the present invention can be tailored to achieve an optimum balance of desirable polymer and zeolite properties.

The innovative composite membranes of the present invention further provide for controlling the effective pore dimensions, porosity, permeability, sorption capacity, and selectivity of the composite membrane through proper selection of zeolite and polymer materials and post-synthesis thermal or chemical treatments.

The invention further provides for zeolite composite membranes with high thermal stability, high ultraviolet stability. Due to the enhanced thermal stability of the membranes of the present invention offer improved selectivity since they can operate over higher temperature ranges without degradation.

Preferred applications for the innovative membranes of the present invention are material separations, such as pervaporation, solvent separation such as separation of alcohol from water, gas sensors where increased selectivity is achieved, absorber layers for solvents or gases, and non-linear optical coating materials.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

A. Hybrid Polymer Approach

Figure 1A:
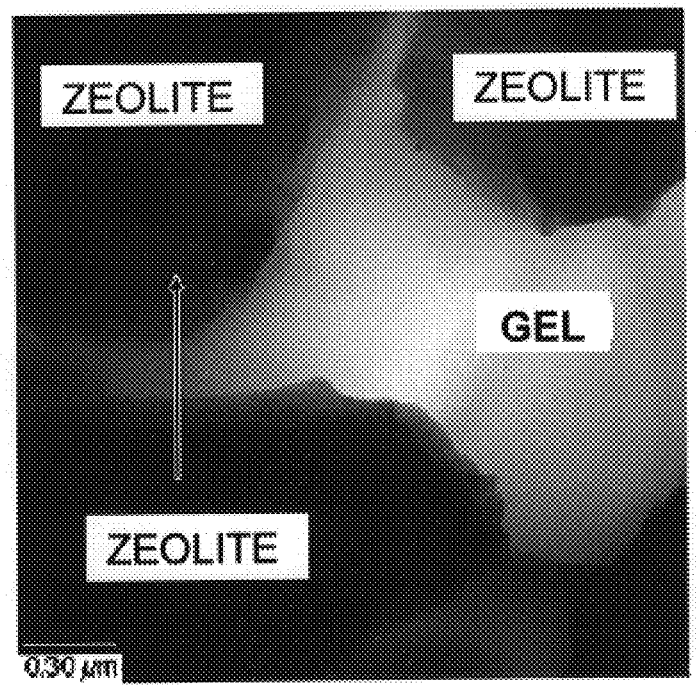
FIGS. 1A–1B are a TEM images of a cured composite material of the present invention showing bonding between the cured MEMO-TEOS polymer and Zeolite 13X.

The method and materials of the present invention employs zeolite additions to inorganic/organic polysiloxane hybrid polymers that are created from certain selected components by hydrolytic condensation. The invention relies on hydrolytic condensation to convert 20–95% mol $(OR^1)_3 SIR^2$ with 5–80% mol $(OR^1)_3$ SiX, where $R^1$ is a $C_1$–$C_4$ alkyl, R² is 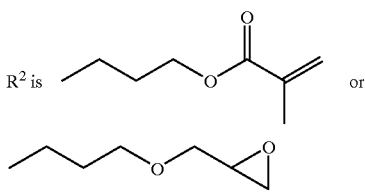 or and X=OR¹ or is

where R¹ has the meaning given above. It has been shown that only when these selected reaction components are used do hybrid polymers with the desired properties result. Here it is especially preferred if R¹=methyl or ethyl. Any known zeolites may be used, including, but not limited to any alkali, alkaline earth, silicate, and aluminosilicate zeolites. Any zeolites having an MFI structure, such as ZSM-5 zeolites or Silicatites, are particularly useful as are the zeolites listed in Table I.

TABLE I

| Type of Zeolite | Formula | Pore Diameter | Nitrogen Absorption | Specific Surface Area |
|---|---|---|---|---|
| Union Carbide Type 3A | $K_9Na_3[(AlO_2)_{12}(SiO_2)_{12}]\cdot 27H_2O$ | 3 Angstroms | 0.70 cc/g | 2.11 m²/g |
| Union Carbide Type 4A | $Na_{12}[(AlO_2)_{12}(SiO_2)_{12}]\cdot 12H_2O$ | 4 Angstroms | | |
| Union Carbide Type 5A | $Ca_{4.5}[(AlO_2)_{12}(SiO_2)_{12}]\cdot 30H_2O$ | 5 Angstroms | | |
| Union Carbide Type 13X | $Na_{86}[(AlO_2)_{86}(SiO_2)_{106}]\cdot 27H_2O$ | 10 Angstroms | 144 cc/g | 466 m²/g |

In most applications, it is preferable to add 5–120% by weight zeolite in relation to the silane components when producing the hybrid polymer. The polymer preferably contains 10–100% by weight zeolite. The zeolite can be added at any stage in the process of producing the hybrid polymer. Preferably, the zeolites are added to the liquid solution, if necessary after prepolymerization with the addition of an initiator. In a preferred embodiment, the zeolites may be pretreated silanes or siloxanes to improve bonding of the zeolite with the polymer matrix. With these treatments, hydrolyzed methoxy groups apparently react with the zeolite surface which improves bonding to the polymer.

One particular advantage of the hybrid polymers in the invention is that they can be produced either with a photo initiator or a thermal radical catalyst. This guarantees that the condensation reaction proceeds under relative mild conditions. However, it is also possible to harden the polymer by thermal drying at temperatures under 150° C. without an initiator or catalyst. Where photo initiators are employed for UV hardening, radical-forming initiators such as 1-hydroxycyclohexylphenylketone or a 1:1 mixture of 1-hydroxycyclohexylphenylketone and benzophenone are especially preferred. For thermal radical catalyst or for thermal drying, radical-forming peroxides like tertiary butyl peroktoate are suitable. The inorganic/organic polysiloxane hybrid polymers of the present invention comprising zeolite additives are especially suitable for the production of thin films and coatings. It should be emphasized that with the hybrid polymers in the invention, either a dense or porous polymer matrix containing zeolites can be specifically tailored to a desired application and produced at relatively low temperatures. It should be pointed out that controlling porosity and permeability is possible with the polymer matrix itself. Because the zeolites are also partially bonded in the polymer system by a chemical bond, the material is chemically and mechanically stable. The porosity of the inorganic/organic hybrid polymers in the invention can also be controlled through controlled decomposition of the polymer matrix by thermal treatment.

B. Materials Preparation

In the method of the present invention, acidic media is used to catalyze the hydrolysis of silanes to produce silanols:

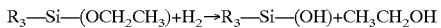

In the example above, the "R" groups may be other alkoxy groups or organic groups not affected by the hydrolysis environment. The hydrolysis is followed by condensation reactions leading to silica moieties which can form a three-dimensional network:

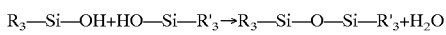

In the event that the "R" groups are other than alkoxy groups they may participate in subsequent reactions. That is, some organic ligands, properly chosen, can be made to form an organic network within the matrix. In this study, we took advantage of the property of a methacrylate group to provide additional crosslinking between the silica moieties formed during the condensation step.

1. Silanes

The polymer matrices which are formed in the present invention are comprised of one or two silanes which were hydrolyzed, then allowed to condense into a film. In some cases, the organic component of the second silane was used to crosslink the matrix using a thermal curing agent or a UV curing agent. Others were dried with no promoter at all. The two silanes were TEOS and what will be called MEMO (3-methacryloxypropyltrimethoxysilane), One or both of the silanes were mixed with appropriate amounts of water and hydrochloric acid to catalyze the hydrolysis reactions. MEMO had the additional property that its organic components could be partially or completely removed by post-synthesis oxidative degradation to modify the porosity of the composite film.

When curing or decomposition is mentioned below, the following conditions should be understood to have been used:

Thermal curing—130° C. for two hours in an open oven

UV curing—80 mW/cm² UV light (two passes@ 80 seconds/pass)

Drying without curing agent—heating to 150° C. at 1° C./minute; holding 3 hours

Oxidative decomposition—350° C. for three hours in an open oven

In the following examples, Irgacure 500 was used as the UV curing agent, while Trigonox 21 was used in the Thermal Curing procedure. However, any suitable initiator or catalyst known to those skilled in the art may be employed.

2. Zeolites

Zeolites 3A and 13X were obtained from Fluka, and dried at 350° C. for 12–16 hours prior to use, then kept in sealed glass vials. IR spectra revealed that they remained essentially moisture-free until use. Individual crystals in both samples were in the range of 1–2 μm in size. The zeolite 13X sample was comprised of single crystals with very little agglomeration. The 3A sample, on the other hand, contained some single crystals, but also contained crystal aggregates on the order of 10 μm in dimension.

Zeolites 3A and 13X were chosen for these studies due to their pore dimensions in relation to the size of the gaseous nitrogen molecule, selected as the probe for sorption capacity. Zeolite 3A has the Linde LTA structure, but with the $Na^+$ cations substantially replaced by $K^+$ cations, making the pores on the order of 3 Å in dimension. That is, the normal pores are just smaller than the nitrogen molecule, and thus any sorption capacity should be on the outer surfaces of the crystals. Zeolite 13X, on the other hand, has pore openings on the order of 10 Å, and admits $N_2$ freely.

3. Zeolite Surface Modification

The surfaces of the zeolite crystals were sometimes modified by attempting to bond silanes to the surface —OH groups using a condensation reaction. This, it was felt, would facilitate the subsequent adhesion between the zeolite crystals and the matrix, especially if the organic ligand could be used to bind to the organic portion of the matrix.

In a typical procedure, zeolites were added to a solution containing MEMO combined with 3 moles of water per mole of MEMO in the form of 0.10 M aqueous HCl. Zeolites were added to make up 15% by weight of the slurry. The solution was stirred at room temperature in a covered round-bottomed flask fitted with a condenser for 2 hours. The product slurry was vacuum filtered, and the resulting zeolite crystals were washed with methanol (ca. 200 ml methanol per 5–20 grams of zeolites) and dried. Drying was in a convection oven at 100° C. for 1 hour, followed by 2 hours at 200° C.

In each case the presence of mid-range FTIR spectroscopy absorption peaks, characteristic of the organic bonds found in MEMO, disappeared in samples that had been thoroughly washed with methanol. The C=O peak at 1720 $cm^{-1}$ and the C=C peak at 1640 $cm^{-1}$, characteristic of groups in the MEMO structure, did not appear in the MEMO-modified zeolite sample. A modified procedure was used to test these possibilities which involved using less than the stoichiometric amount of water required to completely hydrolyze the silanes. Evidence of residual methoxy groups in the dried zeolite sample would indicate that covalent bonding had occurred. 19.2 grams of zeolite (15% by weight), 89.8 grams of MEMO, and 19.1 grams of 0.10 M HCl were mixed in a closed round-bottom flask and stirred at room temperature without a condenser for 2 hours. The products were washed with methanol and dried as before. Peaks in the FTIR spectrum at 2884 $cm^{-1}$ and 2957 $cm^{-1}$ indicated the presence of the $OCH_3$ groups associated with the MEMO molecule, suggesting that the hydrolyzed methoxy groups had indeed reacted with the zeolite surface. These peaks did not appear in the previous samples, since all of the methoxy groups had been hydrolyzed, and presumably reacted with zeolite surface —OH groups during condensation.

4. Reaction Solutions

The reaction solutions from which the matrix was synthesized was comprised of three parts by mole MEMO and one part by mole 0.1M HCl solution by moles. Solutions were poured into round-bottom flasks capped with a condenser and stirred at room temperature for two hours, then formed into a film. Zeolites, when added, generally accounted for about 15% by weight of the final mixture.

MEMO/TEOS derived gels were made with the following amounts of reagents, expressed in moles: TEOS:0.25 MEMO:4.7 Ethanol:6.3 $H_2O$:5.3×$10^{-3}$ HCl where the water included in the 0.1M HCl was accounted for as part of the 6.3 moles added. TEOS, MEMO, and the ethanol solvent were added to a round-bottom flask fitted with a condenser, and stirred at 60° C. The water and acid were added as a solution, after which time the entire solution was stirred for 90 minutes. The contents were then transferred to a screw-cap vial and placed in a convection oven at 50° C. for 140 hours, following which the contents were diluted with ethanol to a 1:2 ratio. Zeolites, if added, generally accounted for about 15% by weight of the final mixture.

C. Analytical Methods

FTIR, SEM, TEM, and $N_2$ adsorption/desorption at liquid nitrogen temperature were used to characterize the composite films made by these procedures. FTIR, SEM, and TEM were used, in particular, to determine the adhesion between the matrix materials and the zeolite crystals. $N_2$ sorption was used to characterize the porosity and sorption capacity of the composite product films, and to give an indication of the pore size and pore size distributions within the composite after certain post-synthesis treatments.

D. Analytical Results

The nitrogen sorption capacity and BET surface area, based on nitrogen, for pure, dehydrated zeolites were measured and shown in Table 1. These values were used as a benchmark for comparison purposes. By way of comparison, a recently reported literature value for the BET surface area for zeolite 13X, based on argon sorption, was 460 $m^2$/g [Yanik, R., *Turk. J Phys.* 20 (1996) 3, 244–248], which was very close to the value reported here, and well within the experimental error in this work. Since the pores in zeolite 3A are smaller than the nitrogen molecule, any sorption must have been on the external surface. The BET surface area also reflects sorption coverage on the external surface rather than inside the pores.

E. Thermal Decomposition Studies of Zeolite-free Polymers

Several films were made using only the silanes used in this study, i.e., without adding zeolites to the mixture. They were cured in the normal ways, and either subsequently decomposed, or not. The nitrogen sorption capacities and BET surface areas of these films were determined in order to compare the zeolite-less films to those containing the two zeolites of study. Results from these experiments indicate that the mass lost upon oxidative degradation at 350° C. was approximately one-half of the predicted loss based on the complete loss of the organic constituents of the fully hydrolyzed and cured matrix.

Results from sorption tests for these polymer films demonstrate that they have essentially no accessible porosity and adsorb about an order of magnitude less nitrogen than zeolite 3A which has intrinsically low absorption. Additionally, the films which had been decomposed at 350° C. showed essentially no adsorption capacity for nitrogen, even though 30–35% of the mass had been removed. This was especially surprising in view of the increased sorption capacity for nitrogen reported for decomposed MEMO films by Cao, et al. [Cao, G., Lu, Y., Delattre, L., Brinker, C. J., and Lopez, G. P., Adv. Mater. 8 (1996) 7, 588–591]. While it was anticipated that thermal decomposition would create a pore structure within the matrix that would exhibit some measurable nitrogen sorption capacity, this was not observed under the test conditions used. It appears that Cao, et al., examined the properties of only one batch composition having a MEMO/TEOS ratio of 1:4 and treated their composites for 140 hours at 50° C. Thus, only one of the present compositions is comparable to Cao's results.

F. Zeolite Content of Solutions

Although zeolites were generally added to reaction solutions at a level of 15% by weight, the subsequent processing of the films caused some evaporation of solvent and water. In addition, some of the zeolites in solution tended to settle without continuous agitation while other reactant solutions were more viscous and the zeolites remained suspended during processing. Such variations in composition are undesirable and require greater control of reactant solution mixing for consistent results in commercial applications.

G. Films Containing MEMO-Modified Zeolites

MEMO-derived gels were made which included MEMO-modified zeolite crystals. Both zeolites 3A and 13X were incorporated, and films were tested before and after thermal decomposition. Nitrogen sorption test results showed that films containing zeolite 3A and films that were not decomposed had virtually no capacity for nitrogen sorption. However, the decomposed film containing zeolite 13X appeared to have a rather large sorption capacity for nitrogen. It is interesting to note that the total capacity for this film is more than what would be estimated on the basis of 15% zeolite in the sample. These results indicate that the polymer matrix is enhancing sorption. It appears that thermal decomposition treatment of the polymer produces microporosity within the polymer matrix which permit nitrogen to enter. This would enable the zeolite to become completely exposed to the nitrogen. The adsorption/desorption curves for this sample showed very little hysteresis, indicating that the pore structure was rather uniform and consisted of small pores. The sorption capacity of the composite film would suggest that it contained the equivalent of 40–50% zeolite by weight based on the sorption capacity of pure zeolite 13X.

H. MEMO-TEOS Polymer Systems

The added flexibility of using two silanes, such as MEMO and TEOS, with different alkoxy groups and organic ligands should provide means to tailor the porosity of the resulting matrix, and allow the appropriate control of diffusing species through the composite material. Nitrogen adsorption/desorption isotherms results for MEMO-TEOS composites made with zeolite 3A indicate that the capacities for the thermally cured samples exhibit substantial sorption capacity while both UV-cured and samples dried without a curing agent had essentially no nitrogen sorption capacity. The thermal curing process appears to opened up the polymer matrix structure to facilitate adsorption and provide additional surface area for sorption beyond that anticipated for zeolite 3A. The sorption test results indicted that the thermally cured sample behaved as mesoporous material with a distribution of rather large pores, large than those associated with zeolite 3A. Similar results indicate that this enhances sorption behavior also occurs with thermally cured zeolite 13X materials.

When these samples are cured using a UV curing agent very low nitrogen sorption is observed. It appears that such curing methods have very little effect on creating microporosity in the polymer matrix since the polymer ligands crosslink and there are essentially no volatilization losses of organic ligands at the low temperatures encounter in the UV curing treatment.

Such observation indicate that, under certain processing conditions, sorption capacity is enhanced by thermal treatment, especially in the presence of the thermal curing agent. Furthermore, the observed sorption capacity was highest whenever zeolite 13X was incorporated. It also was noted that the sorption capacities when using zeolite 13X were very close to the value for pure zeolite 13X (140 cm$^3$/gm) even though these films contained no more than 40–80% by weight zeolite. The high sorption capacity suggests that the matrix itself had a nitrogen sorption capacity and that the microporosity of the matrix was increased when zeolite 13X was used. That is, the sorption capacity of the matrix itself was enhanced by the presence of the 13X crystals, since the matrix without zeolites had no sorption capacity. When zeolite 3A is employed, sorption enhancement is only observed when thermal curing methods are used.

Figure 1B:
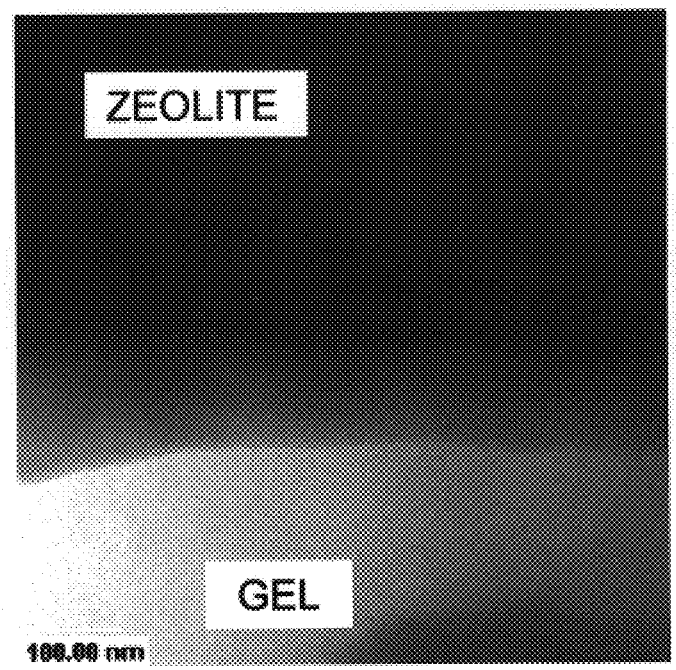

FIGS. 1A–1B shows TEM images of zeolite 13X crystals contained in an as-synthesized UV-cured MEMO-TEOS gel. This sample that had not been oxidatively decomposed or exposed to high temperatures. It is clear from these images that the adherence between the zeolite surface and the gel was quite coherent. No gaps could be found in any portion of the images.

The above experiments indicate that the polymer matrix microporosity may be modified under certain processing conditions. Thus, if one wished to make a selective membrane for oxygen/nitrogen separations, one might wish to restrict nitrogen access, for example, in favor of permeation by oxygen. For example, zeolite 3A, which is inert to nitrogen sorption, may be added to polymer matrices in order to catalyze the development of microporosity during thermal curing and enhance nitrogen sorption. Alternatively, zeolite 13X may be added to polymer matrices to increase the microporosity and sorption capacity of a composite film that is cured at a low temperature using a UV curing agent.

As an alternative treatment, cured composite samples may oxidatively decomposed at 350° C. for three hours. The sorption capacity of these samples is increased by such treatments. Both samples containing zeolite 13x and 3A had increased nitrogen sorption capacity after the oxidative degradation, indicating that sufficient microporosity had developed around the small pore zeolite crystals. However, decomposed samples with 15% by weight zeolite 13X appear to have superior sorption capacity than other samples. It is most likely that some degradation of attached surface species occurs at the thermal decomposition temperature, creating micropore access to the zeolite crystals.

It is important to note that zeolite incorporation should not be limited to the two crystalline phases used in this study. More specifically, other zeolites having catalytic properties could be incorporated as easily as zeolites 3A and 13X. Since the oxidative degradation at 350° C. did not damage the composite film, one could then imagine using these materials to catalyze some higher temperature chemical reactions, thereby facilitating simultaneous reactions and separations across the film.

EXAMPLES

The following examples serve to more fully describe the manner of using the above-described invention, as well as to set forth the best modes contemplated for carrying out various aspects of the invention. It is understood that these examples in no way serve to limit the true scope of this invention, but rather are presented for illustrative purposes.

Example 1

Methacryloxypropyltrimethoxysilane (MEMO)/tetraethoxysilane (TEOS)

A mixture of 10.37 g Methacryloxypropyltrimethoxysilane (MEMO), 34.7 g tetraethoxysilane (TEOS), and 36.06 g ethanol was heated to 60° C. while stirring. To the mixture was added 18.05 g water and 0.89 g in aqueous HCl, and then it was stirred 90 minutes at 60° C. The reaction mixture was stored for 140 hours at 50° C. and then diluted with ethanol in a ratio of 1:2.

A total of six sample solutions was prepared. Three base line samples were prepared without any Zeolite additions to 8.5 g of the reaction mixture. Three sample solutions were prepared 1.5 g of Zeolite 13x added to 8.5 g of the reaction mixture. Irgacure 500 was added to one baseline solution and one Zeolite solution as a photo initiator. Trigonox 21 was added to one baseline solution and one Zeolite solution as a thermal polymerization catalyst. One baseline solution and one Zeolite solution had no initiator. Glass slides were coated with each of the six solutions and each coating sample was hardened by either photoinitiation curing, thermal curing or drying as noted in Table 2 and Table 3. The results for each sample with Zeolite additions are shown in Table 2. The results for each baseline sample without Zeolite additions are shown in Table 3.

TABLE 2

Samples with Addition of Zeolite 13x

|  | Sample 1.1 | Sample 1.2 | Sample 1.3 |
|---|---|---|---|
| Composition |  |  |  |
| Polymer Solution | 8.2 g | 8.2 g | 8.2 g |
| Initiator | 0.3 g Igracure 500 | 0.3 g Trigonox 21 | Smaller |
| Zeolite 13x | 1.5 g | 1.5 g | 1.5 g |
| Hardening | UV-initiated polymerization | Thermally initiated polymerization | Thermal drying |
| Porosity (without I after thermal decomposition of organic components) |  |  |  |
| Nitrogen adsorption | 114 cc/g 1157 cc/g | 60 cc/g 1171 cc/g | 126 cc/g 1135 cc/g |
| Specific surface area | 370 m²/g 1502 m²/g | 190 m²/g 1504 m²/g | 390 m²/g 1437 m²/g |

TABLE 3

Samples without Addition of Zeolite 13x

|  | Sample 1.4 | Sample 1.5 | Sample 1.6 |
|---|---|---|---|
| Composition |  |  |  |
| Polymer Solution | 8.2 g | 8.2 g | 8.2 g |
| Initiator | 0.3 g Igracure | 0.3 g Trigonox 21 | None |
| Zeolite 13x | No | No | No |
| Hardening | UV-initiated polymerization | Thermally initiated polymerization | Thermal drying |
| Porosity (without thermal decomposition of organic components) |  |  |  |
| Nitrogen adsorption | 1.29 cc/g | 1.10 cc/g | 1.82 cc/g |
| Specific surface area | 3.85 m²/g | 1.97 m²/g | 4.79 m²/g |

Example 2
Glycidoxypropyltrimethoxysilane (GLYMO)/3-Aminopropyltriethoxysilane (AMEO)

A reaction mixture of 68.28 g Glycidoxypropyltrimethoxysilane (GLYMO), 3.20 g 3-Aminopropyltriethoxysilane (AMEO) and 7.81 g water was prepared and stirred for 2 hours at 25° C. A total of three sample solutions were prepared. One baseline sample was prepared without any Zeolite additions to 26.42 g of the reaction mixture. A second sample solution was prepared by adding 4.66 g of Zeolite 3A to 26.42 g of the reaction mixture. A third sample solution was prepared by adding 4.66 g of Zeolite 13X to 26.42 of the reaction mixture. Glass slides were coated with each of the three solutions and each coating was hardened by heating for 2 hours at 130° C. The results are shown in Table 4.

TABLE 4

|  | Sample 2.1 | Sample 2.2 | Sample 2.3 |
|---|---|---|---|
| Composition |  |  |  |
| Polymer | 26.42 g | 26.42 g | 26.42 g |
| Initiator | No | no | No |
| Zeolite | no | 4.66 g of Zeolite 3A | 4.66 g of Zeolite 13x |
| Hardening | Thermally polymerization | Thermally initiated polymerization | Thermally initiated polymerization |
| Porosity (without I after thermal decomposition of organic components) |  |  |  |
| Nitrogen adsorption | 0.239 cc/g I0 cc/g | 0.025 cc/g 15.1 cc/g | 0.129 cc/g I84 cc/g |
| Specific surface area | 0.49 m²/g I 0 m²/g | 0.08 m²/g 115 m²/g | 0.3 m²/g 1265 m²/g |

Having described the preferred embodiments of the invention, it will now become apparent to one of skill in the art that other embodiments incorporating the concepts may be used. Therefore, it is not intended to limit the invention to the disclosed embodiments but rather the invention should be limited only by the spirit and scope of the following claims.

What is claimed is:

1. An inorganic/organic polysiloxane hybrid polymer obtained through hydrolytic condensation comprising 20–95% mol $(OR^1)_3SiR^2$ with 5–80% mol $(OR^1)_3SiX$, wherein $R^1=C_1-C_4$ alkyl

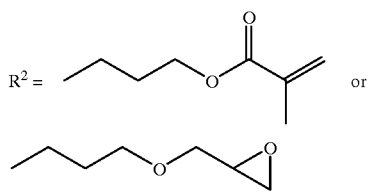

and $X=OR^1$ or

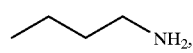

and 5–120% by weight zeolite in relation to the silane components.

2. The hybrid polymer of claim 1 wherein said hydrolytic condensation employs a condensation catalyst.

3. The hybrid polymer of claim 1 comprising 10–100% by weight zeolites.

4. The hybrid polymer in claim 3 wherein said zeolites are selected from the group consisting of alkaline metal, alkaline earth, silicate, aluminosilicate, MFI or ZSM-5 zeolites.

5. The hybrid polymer of claim 1 where in $R^1$ is methyl or ethyl.

6. The hybrid polymer of claim 5 comprising 10–100% by weight zeolites.

7. The hybrid polymer of claim 6 wherein said zeolites are selected from the group consisting of alkaline metal, alkaline earth, silicate, aluminosilicate, MFI or ZSM-5 zeolites.

8. The hybrid polymer of claim 1 further comprising a photo initiator.

9. The hybrid polymer of claim 1 further comprising a thermal polymerization catalyst.

10. A thin film layer comprised of the hybrid polymer of claim 1.

11. A thin film separation membrane comprised of the hybrid polymer of claim 1.

12. A thin film chemical sensor comprised of the hybrid polymer of claim 1.

13. An absorber layer for solvents comprised of the hybrid polymer of claim 1.

14. A non-linear optical layer comprised of the hybrid polymer of claim 1.

* * * * *